US011999377B2

(12) United States Patent
Baughman et al.

(10) Patent No.: US 11,999,377 B2
(45) Date of Patent: Jun. 4, 2024

(54) MOBILE ROBOTS ENABLED WIND FLOW PATTERN ANALYSIS THROUGH WAVELETS (71) Applicant: INTERNATIONAL BUSINESS MACHINES CORPORATION, Armonk, NY (US)

(72) Inventors: Aaron K. Baughman, Cary, NC (US); Shikhar Kwatra, San Jose, CA (US); Jennifer L. Szkatulski, Rochester, MI (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 17/649,800

(22) Filed: Feb. 3, 2022

(65) Prior Publication Data

US 2023/0242143 A1 Aug. 3, 2023

(51) Int. Cl.
*B60W 60/00* (2020.01)
*G05D 1/00* (2024.01)

(52) U.S. Cl.
CPC ........... *B60W 60/001* (2020.02); *G05D 1/101* (2013.01); *B60W 2420/403* (2013.01); *B60W 2552/35* (2020.02); *B60W 2555/20* (2020.02)

(58) Field of Classification Search
CPC ........... B60W 60/001; B60W 2552/35; B60W 2555/20; B60W 2420/42; G05D 1/101
See application file for complete search history.

(56) References Cited

U.S. PATENT DOCUMENTS

| 10,678,233 | B2 | 6/2020 | Cella |
| 10,742,399 | B2 | 8/2020 | Chen |
| 11,009,865 | B2 | 5/2021 | Cella |
| 11,048,248 | B2 | 6/2021 | Cella |
| 2016/0325844 | A1 | 11/2016 | Mehlen |
| 2020/0234601 | A1* | 7/2020 | Ivanov ................. G09B 29/003 |

FOREIGN PATENT DOCUMENTS

| CN | 110426046 A | 11/2019 |
| DE | 202015100823 U1 | 5/2015 |
| JP | 2018-112495 | * 7/2018 |
| JP | 2018112495 A | 7/2018 |

OTHER PUBLICATIONS

JP 2018-112495 A machine translation (Year: 2018).*

(Continued)

*Primary Examiner* — Anne Marie Antonucci
*Assistant Examiner* — Jingli Wang
(74) *Attorney, Agent, or Firm* — Robert D. Bean (57) ABSTRACT According to one embodiment, a method, computer system, and computer program product for navigating an autonomous vehicle is provided. The present invention may include measuring, in real time, movement patterns of air in the surroundings of the autonomous vehicle; analyzing the movement patterns to identify wind flow patterns, terrain, and passage in the surroundings; and navigating the autonomous vehicle based on the identified wind flow patterns, terrain, and passage.

17 Claims, 6 Drawing Sheets

(56) References Cited

OTHER PUBLICATIONS

Anonymous, "CTU Reports—Proceedings of the Tenth Annual University-wide seminar Workshop 2003 Part A", Czech Technical University in Prague, Feb. 2003, 1212 pages, vol. 7, ISBN: 80-01-02708-2, retrieved from the Internet: <URL: https://sgs.cvut.cz/workshopy/ws2003.pdf>.

Disclosed Anonymously, "Human and Robotic Interaction Enabled Communication and Behavioral Safeguards," IP.com, Apr. 17, 2020, 6 pages, IP.com No. IPCOM000261923D, Retrieved from the Internet: <URL: https://priorart.ip.com/IPCOM/000261923>.

Disclosed Anonymously, "System and Method for Cleaner Robot Operations with Dynamic Modifications for User Contextual Situations," IP.com, Jan. 19, 2021, 7 pages, IP.com No. IPCOM000264702D, Retrieved from the Internet: <URL: https://priorart.ip.com/IPCOM/000264702>.

Fernandez-Carmona, et al., "Wavelet-based Temporal Models of Human Activities for Anomaly Detection," CoRR [journal], Feb. 26, 2020, 14 pages, arXiv:2002.11503v1, Retrieved from the Internet: <URL: https://arxiv.org/abs/2002.11503>.

Heuveline, et al., "Augmented Reality for Urban Simulation Visualization," INFOCOMP 2011 : The First International Conference on Advanced Communications and Computation, Jul. 1, 2011, pp. 115-119, IARIA, 2011, ISBN: 978-1-61208-161-8Retrieved from the Internet: <URL: https://journals.ub.uni-heidelberg.de/index.php/emcl-pp/article/view/11682>.

Mell, et al., "The NIST Definition of Cloud Computing", National Institute of Standards and Technology, Special Publication 800-145, Sep. 2011, 7 pages.

Senarathne, "Method and Apparatus for Autonomous Navigation of Mobility Devices," IP.com, Feb. 19, 2020, 28 pages, Continental Group, IP.com No. IPCOM000261300D, Retrieved from the Internet: <URL: https://priorart.ip.com/IPCOM/000261300>.

Sharma, "What are the applications of Bernoulli's theorem?," Quora [online], 2016 [accessed on Aug. 16, 2021], 5 pages, Retrieved from the Internet: <URL: https://www.quora.com/What-are-the-applications-of-Bernoullis-theorem>.

Yao, et al., "Augmented Reality Technology Based Wind Environment Visualization," 2018, 9 pages, Semantic Scholar, Retrieved from the Internet: <URL: https://www.semanticscholar.org/paper/AUGMENTED-REALITY-TECHNOLOGY-BASED-WIND-ENVIRONMENT-Yao-Lin/448c4a227dcbccb075be83883c850a0bda3b51bc>.

International Searching Authority, "Notification of Transmittal of the International Search Report and the Written Opinion of the International Searching Authority, or Declaration," Patent Cooperation Treaty, May 22, 2023, 9 pages, International Application No. PCT/CN2023/074255.

Baughman, et al., "Mobile Robots Enabled Wind Flow Pattern Analysis Through Wavelets," Application and Drawings, Filed on Feb. 2, 2023, 29 Pages, Related PCT Patent Application Serial No. PCT/CN2023/074255.

\* cited by examiner

MOBILE ROBOTS ENABLED WIND FLOW PATTERN ANALYSIS THROUGH WAVELETS

BACKGROUND

The present invention relates, generally, to the field of computing, and more particularly to autonomous navigation.

Autonomous navigation is a field concerned with planning and executing a path of an autonomous vehicle without human intervention, based for example on remote navigation aids, inputs from sensors on board the vehicle itself, and/or sensors in the environment of the autonomous vehicle. Once basic position information is gathered in the form of triangulated signals or environmental perception, machine intelligence must be applied to translate some basic motivation (reason for leaving the present position) into a route and motion plan. As prototypical autonomous vehicles become more sophisticated in their abilities and design, autonomous navigation capabilities become increasingly crucial to the development of truly autonomous vehicles sophisticated enough to operate in public spaces and make meaningful contributions to human endeavor in more chaotic contexts such as rescue operations.

SUMMARY

According to one embodiment, a method, computer system, and computer program product for navigating an autonomous vehicle is provided. The present invention may include measuring, in real time, movement patterns of air in the surroundings of the autonomous vehicle; analyzing the movement patterns to identify wind flow patterns, terrain, and passage in the surroundings; and navigating the autonomous vehicle based on the identified wind flow patterns, terrain, and passage.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to autonomous navigation. The following described exemplary embodiments provide a system, method, and program product to, among other things, navigate an autonomous vehicle based on analyzing the airflow in the surroundings of the autonomous vehicle to detect wind flow patterns, terrain, and passage. Therefore, the present embodiment has the capacity to improve the technical field of autonomous navigation by providing a method to identify terrain based on wind flow which may not be detectable by radar, identify empty passages where the autonomous vehicle can move, and identifying wind flow to put together a more complete picture of an environment and to thereby improve the quality of routes plotted through the environment.

As previously described, autonomous navigation is a field concerned with planning and executing a path of an autonomous vehicle without human intervention, based for example on remote navigation aids, inputs from sensors on board the vehicle itself, and/or sensors in the environment of the autonomous vehicle. Once basic position information is gathered in the form of triangulated signals or environmental perception, machine intelligence must be applied to translate some basic motivation (reason for leaving the present position) into a route and motion plan. As prototypical autonomous vehicles become more sophisticated in their abilities and design, autonomous navigation capabilities become increasingly crucial to the development of truly autonomous vehicles sophisticated enough to operate in public spaces and make meaningful contributions to human endeavor in more chaotic contexts such as rescue operations.

During, for example, rescue operations, identification of passage, empty spaces, movement path, open area, et cetera are important for dictating how an autonomous vehicle should be moving in its surroundings. In any disaster area a movement path cannot be predefined for an autonomous vehicle; therefore, a path needs to be discovered on a real-time basis, and an appropriate mode of rescue must be performed. SONAR wave moves straight, whereas wind flows in all directions; as such, an autonomous vehicle equipped with SONAR alone cannot perceive terrain that is not visible, so such an autonomous vehicle is incapable of identifying whether a passage is available where the autonomous vehicle can move if the passage isn't in the line of sight of the autonomous vehicle. A wind flow analysis casts a light of understanding on a symbiotic relationship between an unmanned vehicle and the environment; the wind flow can complement the movements of both terrestrial and aerial autonomous vehicles and reduce the effort they must exert within the environment by, for example, informing an autonomous vehicle which direction to face or orient a payload such that the wind pushes the payload in the downhill direction for terrestrial vehicles, and/or to equalize or improve the balancing of the autonomous vehicle and/or a payload carried by terrestrial or aerial autonomous vehicle to improve stability and prevent overbalancing. The wind flow analysis can also reveal the wind flow, presence of obstacles, temperature of the obstacles, direction of movement of the obstacles, dimensions of the obstacles, empty spaces, open area, passages through an area, et cetera, that might not be within direct line of sight of the autonomous vehicle. As such, by measuring and analyzing air patterns in its surroundings, an autonomous vehicle can determine a more detailed picture of the environment surrounding it than can be determined by SONAR or RADAR alone and can thereby improve the navigation of the autonomous vehicle. As such, it may be advantageous to, among other things, implement a system that regularly gathers information regarding the airflow in the vicinity of an autonomous vehicle and analyzes the airflow information to produce improved awareness of the surrounding terrain and wind conditions and thereby improve navigation of the autonomous vehicle by plotting routes based on this more detailed and dynamically updated understanding of the surrounding environment.

According to one embodiment, the invention is a system to analyze the movement pattern of air in the surroundings of an autonomous vehicle to identify passage, terrain, and wind flow, and navigate the autonomous vehicle based on the identified passage, terrain, and wind flow.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to navigate an autonomous vehicle based on analyzing the airflow in the surroundings of the autonomous vehicle to detect wind flow patterns, terrain, and passage.

Figure 1:
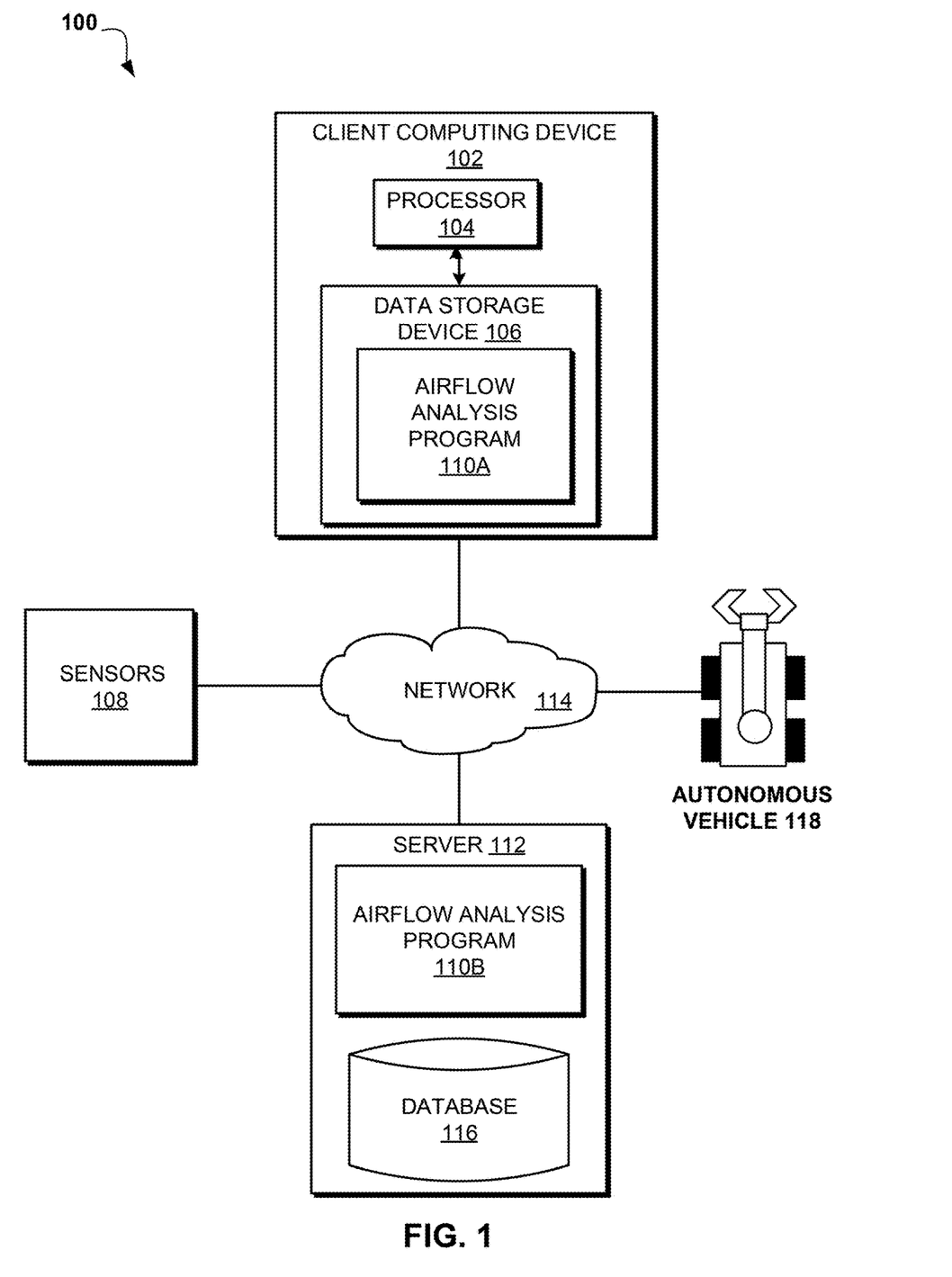
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, airflow sensor 108, autonomous vehicle 118, and a server 112 interconnected via a communication network 114. According to at least one implementation, the networked computer environment 100 may include a plurality of client computing devices 102, sensors 108, autonomous vehicles 118 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run an airflow analysis program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a airflow analysis program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Sensor 108 may be sensing devices capable of detecting the properties of air in the surroundings of the autonomous vehicle 118, including its speed, direction, density, pressure, volumetric flow, composition, et cetera. Sensor 108 may comprise a mass flow sensor, an air quality sensor, a thermometer, an anemometer, a vortex sensor, a humidity sensor, altimeter, et cetera. Sensor 108 may also include a visual and/or infrared camera, for example in embodiments where airflow analysis program 110A, 110B creates a data representation of air flow paths by combining air flow data and camera data. Sensor 108 may comprise a device capable of identifying the relative or absolute position of the autonomous vehicle 118 such as a GPS receiver, radar, sonar, et cetera. Sensor 108 may be capable of communicating with airflow analysis program 110A, 110B, and may be integrated into computing device 102 and/or autonomous vehicle 118.

Autonomous vehicle 118 may be a vehicle capable of autonomous movement. While autonomous vehicle 118 may comprise a cockpit or controls to accommodate and allow interface with a human being, autonomous vehicle 118 may nevertheless be capable of movement plotted and executed by a computer without human intervention. Autonomous vehicle 118 may be any tracked or wheeled vehicle, fixed-wing or variable-wing aircraft and/or rotorcraft, or any other aerial or terrestrial vehicle. Autonomous vehicle 118 may be equipped to communicate with airflow analysis program 110A, 110B and to receive instructions from airflow analysis program 110A, 110B, such that airflow analysis program 110A, 110B may control the autonomous movement of autonomous vehicle 118. Autonomous vehicle 118 may comprise one or more sensors 108. In some embodiments of the invention, autonomous vehicle 118 may be equipped with devices to generate air flow, such as fans, turbines, jets, tanks of pressurized air, oscillating vanes, et cetera. These air flow generating devices may point in a fixed direction or may be moveable such that they may be positioned to create air flow in a number of directions. In some embodiments of the invention, the devices to generate air flow may be simply devices that create incidental airflow through propulsion of the autonomous vehicle 118, such as propulsion rotors, jet engines, wheels, et cetera. In some embodiments of the invention, the devices to generate air flow may be purpose-built airflow generating devices, which may be distinct from propulsion devices or other devices or functionalities that incidentally create airflow in that the purpose-built devices to generate air flow may be devices with functionality specifically enhanced for the purpose of generating airflow, or with the primary purpose for generating airflow, rather than moving the autonomous vehicle 118. Such purpose-built airflow generating devices may include devices to increase or alter drag of the autonomous vehicle 118 to generate airflow, rotors or blowers mounted with more degrees of rotation than necessary for propulsion with the goal of creating airflow in a particular direction, airflow generating devices with their thrust offset or compensated for by propulsion devices, et cetera.

According to the present embodiment, the airflow analysis program 110A, 110B may be a program enabled to navigate an autonomous vehicle based on analyzing the airflow in the surroundings of the autonomous vehicle to detect wind flow patterns, terrain, and passage. The airflow analysis program 110A, 110B may be located on client computing device 102 or server 112 or on any other device located within network 114. Furthermore, airflow analysis program 110A, 110B may be distributed in its operation over multiple devices, such as client computing device 102 and server 112. The air flow analysis method is explained in further detail below with respect to FIG. 2.

Figure 2:
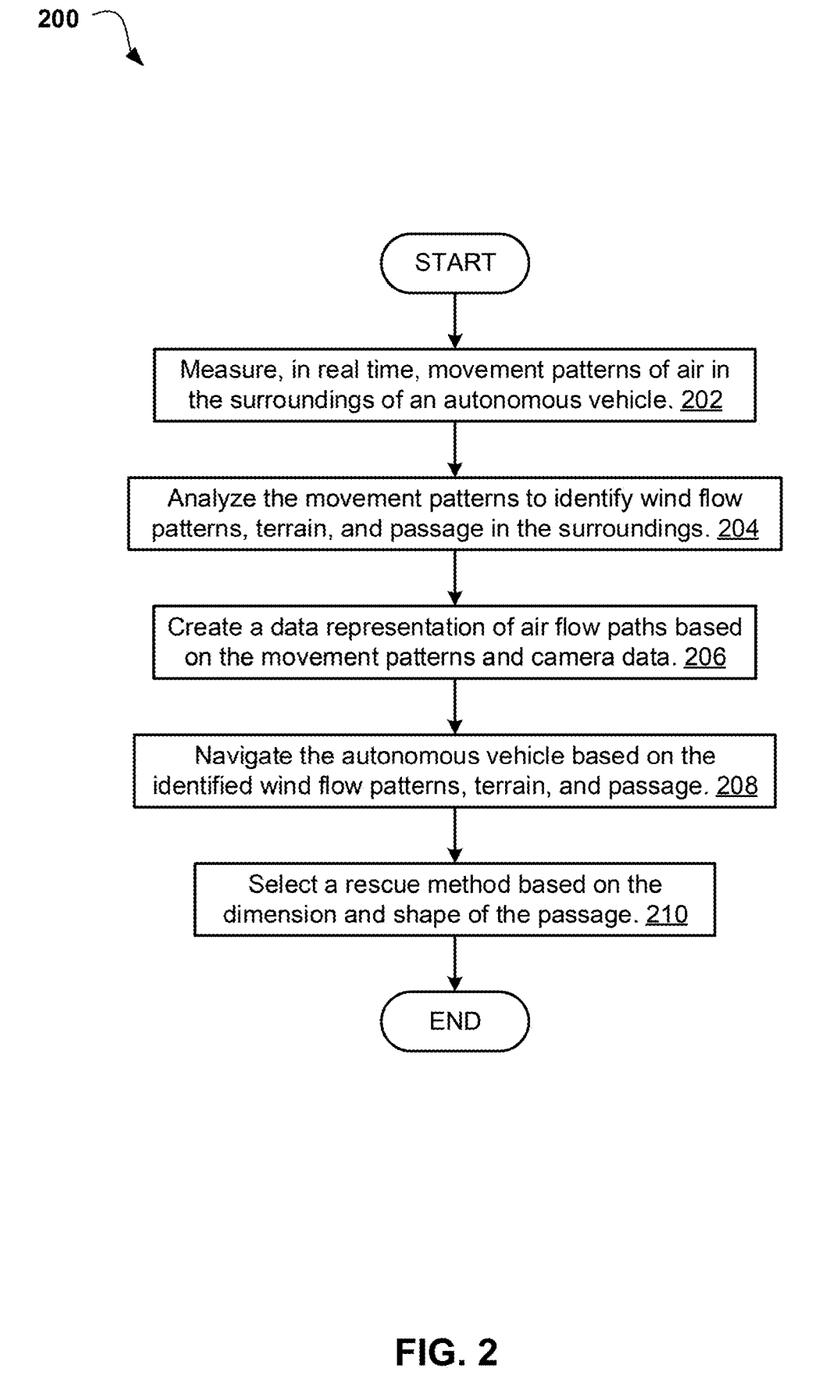
FIG. 2 is an operational flowchart illustrating an air flow analysis process according to at least one embodiment.

Referring now to FIG. 2, an operational flowchart illustrating an air flow analysis process 200 is depicted according to at least one embodiment. At 202, the airflow analysis program 110A, 110B may measure, in real time, movement patterns of air in the surroundings of an autonomous vehicle 118. The airflow analysis program 110A, 110B may receive measurements from sensors 108 regarding the speed, direction, density, pressure, volumetric flow, composition, et cetera of air in the surroundings of autonomous vehicle 118. The "surroundings" of autonomous vehicle 118 may include a radius around the autonomous vehicle 118 representing the maximum region of the environment wherein airflow analysis program 110A, 110B can identify terrain based on air flow. In some embodiments of the invention, the airflow analysis program 110A, 110B may operate the autonomous vehicle to create airflow, for instance by simply moving the autonomous vehicle 118, and/or via air flow generating devices integrated into the autonomous vehicle 118, for example in situations where ambient air patterns are below a threshold of activity necessary to produce sufficient analysis. In an example where there are two autonomous vehicles 118, a first autonomous vehicle 118 may operate, through movement or the use of air flow generating devices, to create a wind vacuum or slipstream behind its direction of travel; second autonomous vehicle 118 may, having detected the slipstream using airflow analysis or communication with the first autonomous vehicle 118, position itself to move behind the first autonomous vehicle 118 within the slipstream and thereby reduce the energy required for movement.

At 204, the airflow analysis program 110A, 110B may analyze the movement patterns to identify wind flow patterns, terrain, and passage in the surroundings. The airflow analysis program 110A, 110B may analyze the air flow data and how the air flow data changes over time and/or based on the position and/or movement of the autonomous vehicle 118 to identify terrain, passages, and wind flow in the surroundings of the autonomous vehicle 118. The terrain may include the positions of obstacles, empty spaces, corridors, et cetera in the surroundings of the autonomous vehicle 118. The airflow analysis program 110A, 110B may identify air flow effects caused by the autonomous vehicle 118 itself and air flow effects caused by the terrain, and control for these effects to isolate air flow caused by the wind, thereby identifying the wind flow. Based on the terrain and the wind flow, the airflow analysis program 110A, 110B may identify a passage through the terrain, where a passage is a route through which the autonomous vehicle 118 can move to reach its destination or make progress through the terrain. For example, the airflow analysis program 110A, 110B may identify two corridors, but airflow analysis may reveal that the first corridor is blocked off somewhere in the distance, whereas the second corridor has air moving through it and therefore is connected to the outdoors; this second corridor may accordingly be identified as a passage by airflow analysis program 110A, 110B. In some embodiments of the invention, airflow analysis program 110A, 110B may utilize historical patterns of airflow and vehicle movement to aid in identifying or predicting the presence of obstacles, routes, et cetera. In some embodiments of the invention, airflow analysis program 110A, 110B may identify the effect of autonomous vehicle 118 on the air patterns in the surroundings.

At 206, the airflow analysis program 110A, 110B may create a data representation of air flow paths based on the movement patterns and camera data. Here, airflow analysis program 110A, 110B may analyze a camera feed from sensor 108 to identify the dimension and shape of various obstacles, dimension and shape of various passages and empty space, the speed and direction of movement of the obstacles, and to gather a visual map of the surroundings. The airflow analysis program 110A, 110B may also analyze a thermal camera feed from sensor 108 to identify a temperature distribution in the surroundings of the autonomous vehicle 118. The airflow analysis program 110A, 110B may create a data representation by overlaying the flow paths onto the camera and/or thermal camera data to illustrate how the air flow pattern in the surroundings changes based on the various obstacles, structures, and other environmental features present in the surroundings; this data representation may be used to identify relationships between the wind flow and structures, temperatures, obstacles, terrain, vehicles, vehicle movement, et cetera. These identified relationships may improve identification of similar obstacles and/or environments based on air flow data, and/or may be used to predict the presence of obstacles, routes, terrain, et cetera, and may be used to predict windflow given certain terrain, surrounding obstacles, environmental conditions, et cetera. The data representation may also incorporate past predictions, sensor data, environments, vehicles, attempted rescue methods et cetera, and make future predictions based on this historical data. The data representation, or analysis of the data representation, may be provided to or employ a machine learning algorithm to improve accuracy of relationship identification over time and iteration.

In some embodiments of the invention, airflow analysis program 110A, 110B may use the concept of migration analysis in the data representation, wherein autonomous vehicles 118 are represented as parasites and the environment, and/or elements within the environment, are represented as hosts. In some embodiments, the environment may refer to a localized perimeter around an autonomous vehicle 118. There may be multiple hosts and parasites within an area. Wavelets may be created by applying Babor filters to the data representation of the airflow. The stronger the airflow created by a parasite, the better (more fit) the function. As a result, the other parasites may move towards the better fitness function. In some embodiments of the invention, airflow analysis program 110A, 110B may migrate one or more parasites to a high-performing environment to determine algorithmically how the wavelets would change. The airflow analysis program 110A, 110B may average a given parasite's current environmental fitness and migrated environment; the higher the environmental fitness and migrated environment, the better the autonomous vehicle 118 represented by the parasite is performing. In some embodiments of this invention, airflow analysis program 110A, 110B may identify one or more autonomous vehicles 118 as high performing based on the performance exceeding a performance threshold, wherein the performance threshold represents a value of average environmental fitness above which an autonomous vehicle 118 may be considered to be high-performing. The migration analysis may be performed at regular intervals and/or in real time, to maintain an up-to-date assessment of the autonomous vehicles' 118 performance. In some embodiments of the invention, airflow analysis program 110A, 110B may navigate autonomous vehicles 118 based on the migration analysis, for example by navigating non-high-performing autonomous vehicles 118 towards high-performing autonomous vehicles 118 to improve the performance of the non-high-performing autonomous vehicles 118.

At 208, the airflow analysis program 110A, 110B may navigate the autonomous vehicle based on the identified wind flow patterns, terrain, and passage, as well as the data representation. The airflow analysis program 110A, 110B may operate the autonomous vehicle to avoid obstacles identified by the air data analysis, and to follow a route based on a passage identified by the air data analysis. In some embodiments, the airflow analysis program 110A, 110B may navigate the autonomous vehicle 118 to reduce the effort the autonomous vehicle 118 must exert within the environment and the safety of itself and a payload it is carrying by, for example, operating the autonomous vehicle 118 to face or orient itself and/or the payload such that the wind pushes the payload in the downhill direction, and/or distribute the weight of the autonomous vehicle 118 and the payload against the direction the wind is blowing to equalize or improve the balance of the autonomous vehicle 118 and the payload to improve stability and prevent overbalancing. In some embodiments, such as where autonomous vehicle 118 is an aircraft, the airflow analysis program 110A, 110B may also operate the autonomous vehicle 118 to compensate for the detected or predicted airflow based on the passage and/or terrain to maintain level flight and/or to successfully navigate the route through the passage. In some embodiments of the invention, airflow analysis program 110A, 110B may navigate autonomous vehicles 118 based on the migration analysis, for example by navigating non-high-performing autonomous vehicles 118 towards high-performing autonomous vehicles 118 to improve the performance of the non-high-performing autonomous vehicles 118.

At 210, the airflow analysis program 110A, 110B may select a rescue method based on the dimension and shape of the passage. The rescue method may include methods of operating one or more autonomous vehicles 118 to achieve a rescue objective such as gathering reconnaissance in a disaster zone, identifying individuals in need of medical attention, identifying individual objects of importance, delivering supplies, et cetera. Rescue methods may include any number or combination of methods relevant to achieving the rescue objective, such as path finding, mapping, traffic control, vehicle coordination, coordination with human rescuers, vehicle efficiency, etc. Rescue methods may be assessed multiple times based on new data and/or the progression of one or more autonomous vehicles to a new area. The airflow analysis program 110A, 110B may, for example, identify where the autonomous vehicle 118, other autonomous vehicles 118, and/or human-occupied terrestrial or aerial vehicles may park, land, or travel based on the dimension and/or shape of the passage and the navigation requirements of multiple autonomous vehicles 118 and/or human-occupied vehicles.

Figure 3:
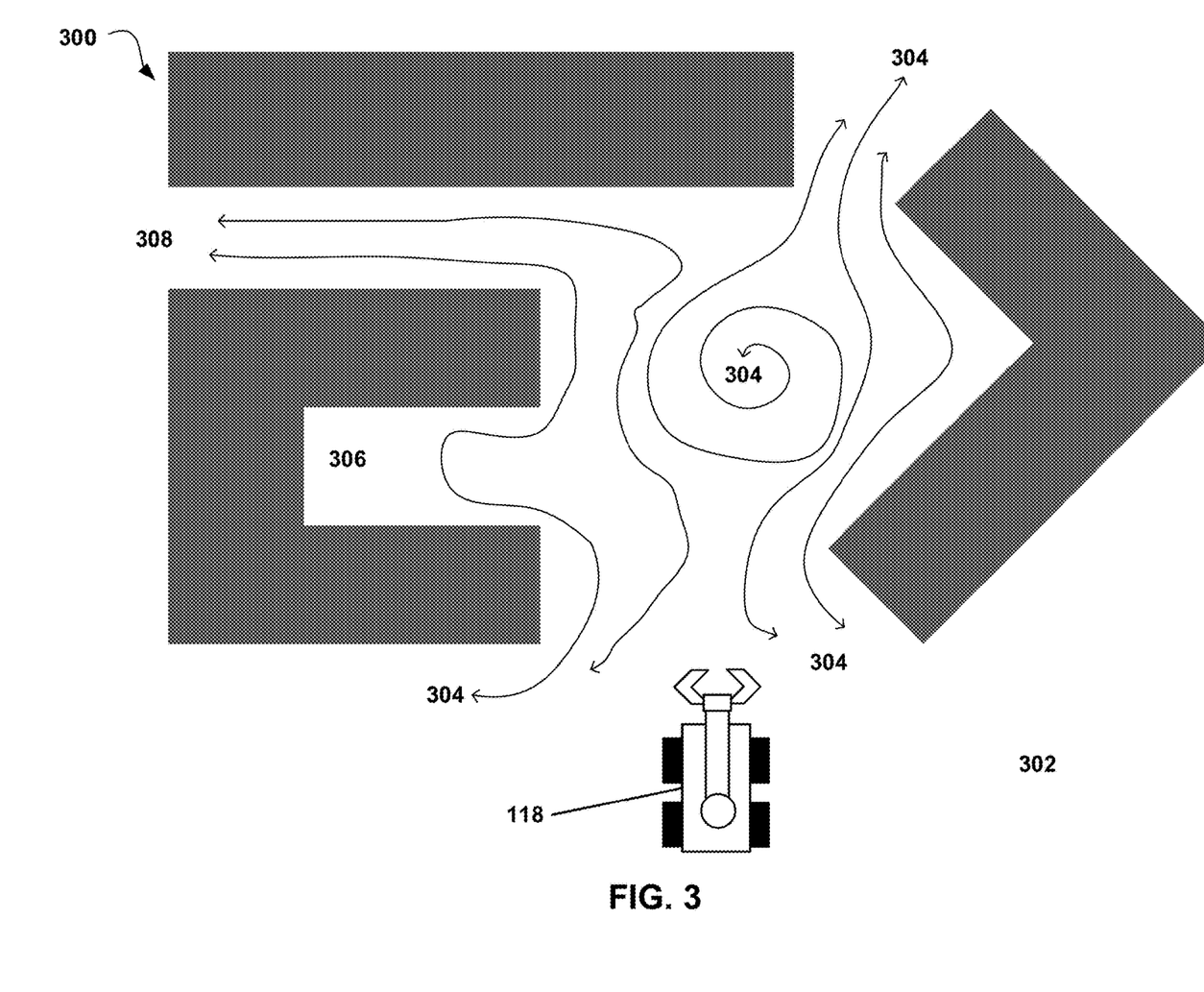
FIG. 3 is a diagram illustrating an exemplary use case of a system executing an air flow analysis process according to at least one embodiment.

Referring now to FIG. 3, a diagram illustrating an exemplary use case 300 of a system executing an air flow analysis process 200 according to at least one embodiment. Here, an autonomous vehicle 118, running airflow analysis program 110A, 110B on an internal client computing device 102, is operating in a structure 302. The openings of two passages are visible to autonomous vehicle 118 from its current location: first passage 306 and second passage 308. Autonomous vehicle 118 is attempting to navigate through structure 302. By examining the air currents 304 flowing through the structure 302, autonomous vehicle 118 may identify that air is not flowing through first passage 306; autonomous vehicle 118 may accordingly conclude that first passage 306 is blocked even though the blockage is further down the passageway than camera feed, radar and sonar may detect. Furthermore, autonomous vehicle 118 may conclude that second passageway 308 is not blocked, because air is flowing through it. Autonomous vehicle 118 may then successfully navigate through structure 302 via second passageway 308 without having to spend time traveling down first passageway 306 to identify whether or not it was traversable.

It may be appreciated that FIGS. 2-3 provides only illustrations of individual implementations and do not imply any limitations with regard to how different embodiments may be implemented. Many modifications to the depicted environments may be made based on design and implementation requirements. For example, multiple autonomous vehicles 118 may be working in concert to individually analyze wind flow pattern and collaboratively identify obstacles and the best possible passages such that the autonomous vehicles may move together with improved efficiency and reduced risk of collision or blocking.

Figure 4:
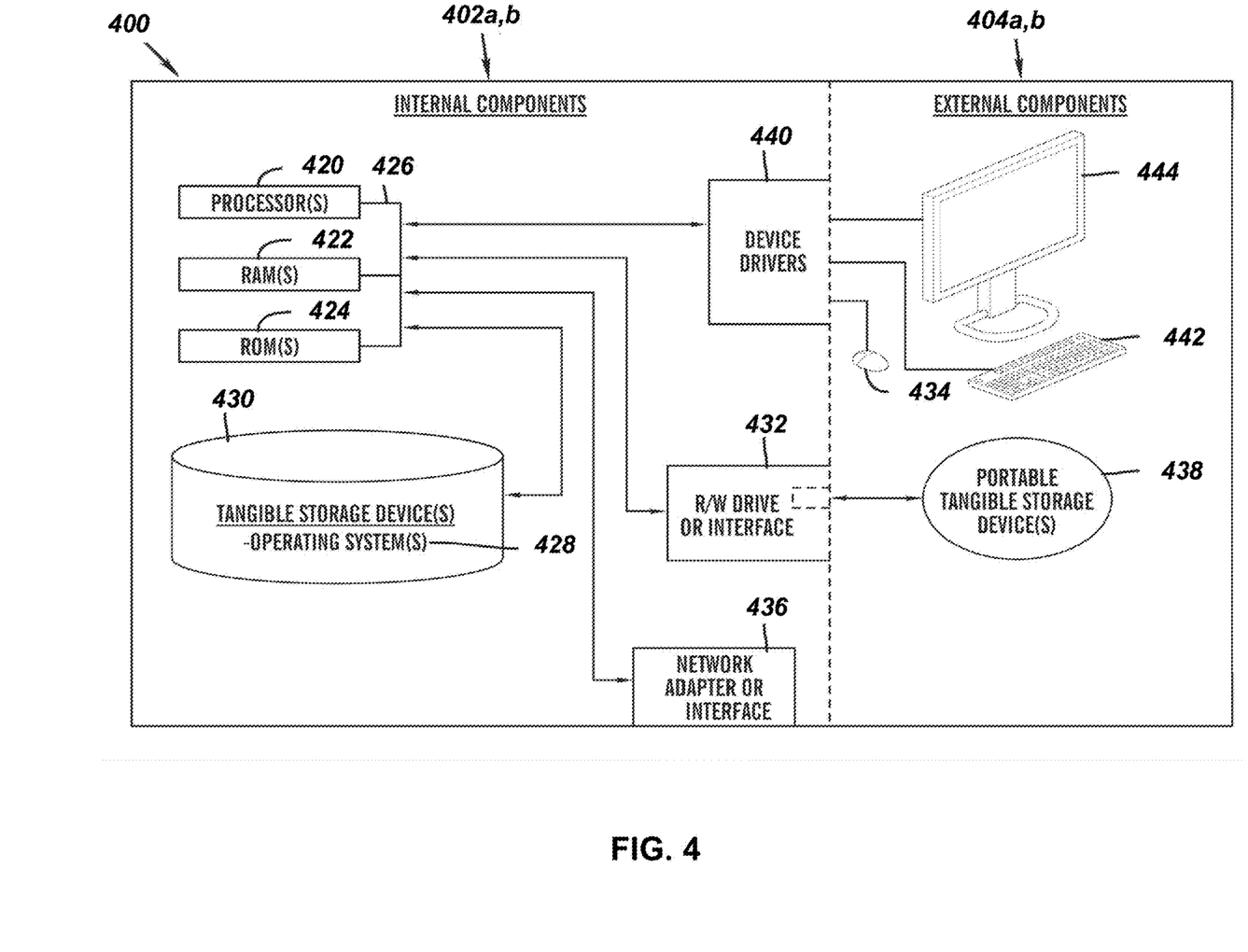
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the airflow analysis program 110A in the client computing device 102, and the airflow analysis program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the airflow analysis program 110A, 110B, can be stored on one or more of the respective portable computer-readable tangible storage devices 438, read via the respective RAY drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The airflow analysis program 110A in the client computing device 102 and the airflow analysis program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the airflow analysis program 110A in the client computing device 102 and the airflow analysis program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, RAY drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
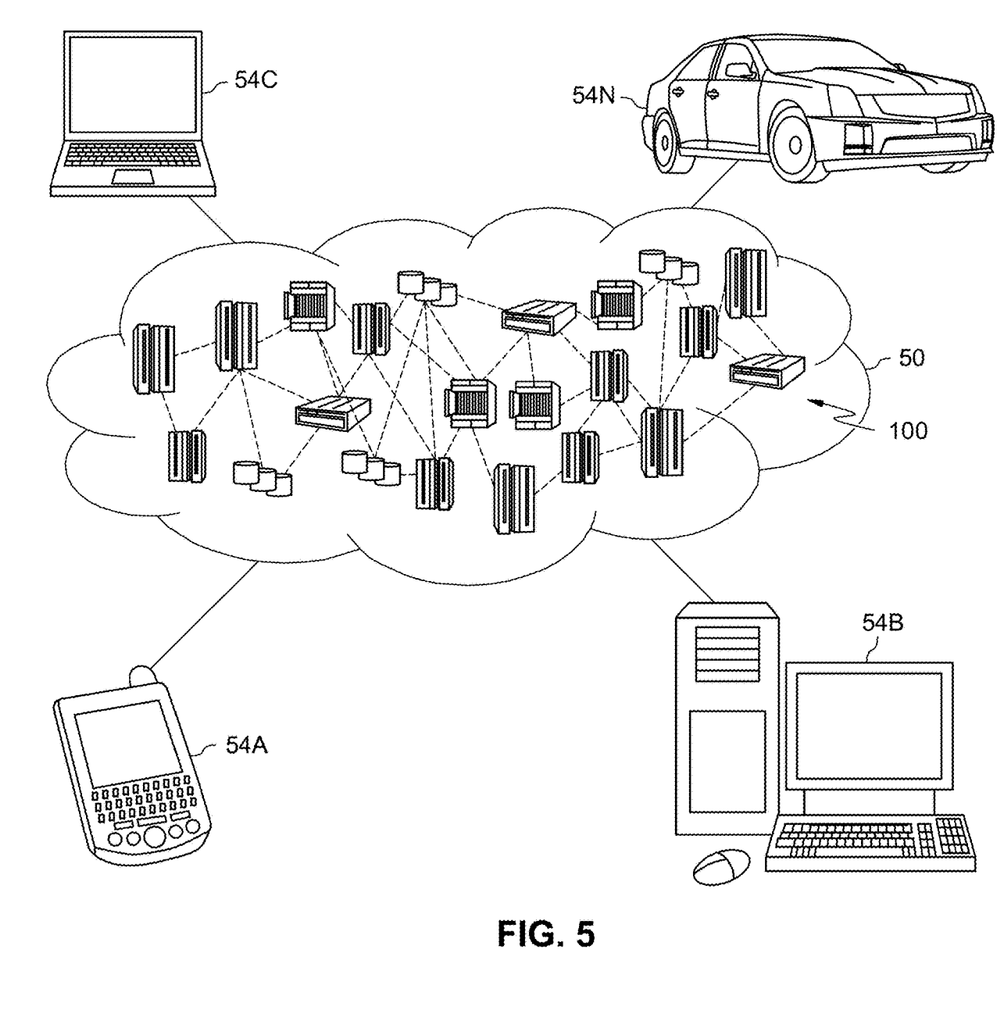
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
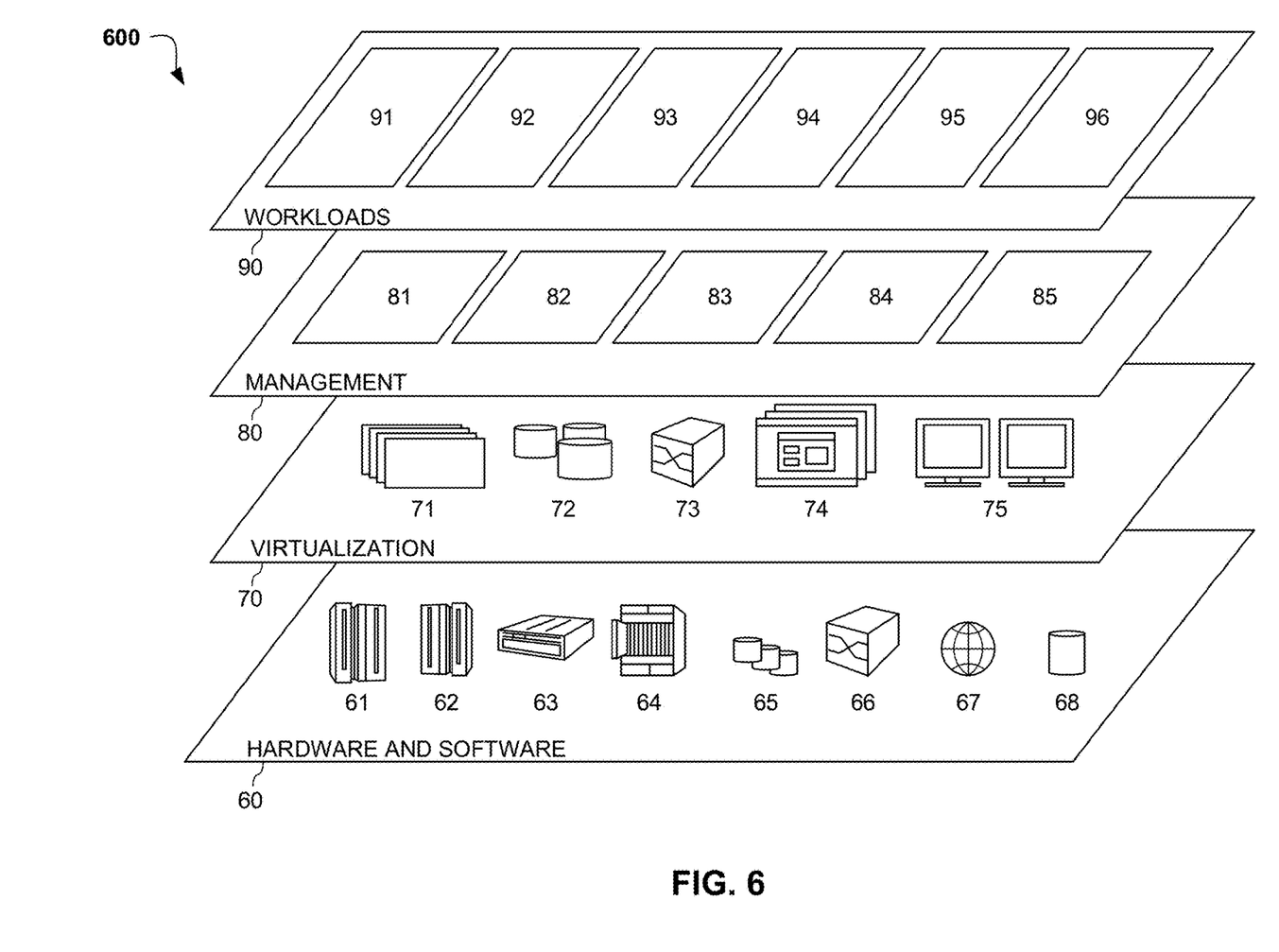
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and air flow analysis 96. The airflow analysis 96 may be enabled to navigate an autonomous vehicle based on analyzing the airflow in the surroundings of the autonomous vehicle to detect wind flow patterns, terrain, and passage.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for navigating an autonomous vehicle, the method comprising:
    measuring, in real time, movement patterns of air in the surroundings of the autonomous vehicle;
    analyzing the movement patterns to identify wind flow patterns, terrain, and passage in the surroundings;
    navigating the autonomous vehicle based on the identified wind flow patterns, terrain, and passage; and
    responsive to identifying that a fitness of the autonomous vehicle exceeds a threshold value, navigating one or more additional autonomous vehicles towards the autonomous vehicle.

2. The method of claim 1, further comprising:
    predicting one or more air flow patterns based on a data representation of air flow paths created based on the movement patterns and camera data.

3. The method of claim 1, wherein a fitness of the one or more additional autonomous vehicles falls below the threshold value.

4. The method of claim 1, wherein the autonomous vehicle is equipped with one or more air flow generating devices.

5. The method of claim 1, further comprising:
    selecting a rescue method based on the dimension and shape of the passage.

6. The method of claim 1, further comprising:
    navigating the autonomous vehicle to maintain level flight based on the air flow data.

7. A computer system for navigating an autonomous vehicle, the computer system comprising:
    one or more sensors, one or more autonomous vehicles, one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
        measuring, in real time, movement patterns of air in the surroundings of the autonomous vehicle;

analyzing the movement patterns to identify wind flow patterns, terrain, and passage in the surroundings;

navigating the autonomous vehicle based on the identified wind flow patterns, terrain, and passage; and responsive to identifying that a fitness of the autonomous vehicle exceeds a threshold value, navigating one or more additional autonomous vehicles towards the autonomous vehicle.

8. The computer system of claim 7, further comprising: predicting one or more air flow patterns based on a data representation of air flow paths created based on the movement patterns and camera data.

9. The computer system of claim 7, wherein a fitness of the one or more additional autonomous vehicles falls below the threshold value.

10. The computer system of claim 7, wherein the autonomous vehicle is equipped with one or more air flow generating devices.

11. The computer system of claim 7, further comprising: selecting a rescue method based on the dimension and shape of the passage.

12. The computer system of claim 7, further comprising: navigating the autonomous vehicle to maintain level flight based on the air flow data.

13. A computer program product for navigating an autonomous vehicle, the computer program product comprising:

one or more computer-readable tangible storage medium and program instructions stored on at least one of the one or more tangible storage medium, the program instructions executable by a processor to cause the processor to perform a method comprising:

measuring, in real time, movement patterns of air in the surroundings of the autonomous vehicle;

analyzing the movement patterns to identify wind flow patterns, terrain, and passage in the surroundings;

navigating the autonomous vehicle based on the identified wind flow patterns, terrain, and passage; and responsive to identifying that a fitness of the autonomous vehicle exceeds a threshold value, navigating one or more additional autonomous vehicles towards the autonomous vehicle.

14. The computer program product of claim 13, further comprising:

predicting one or more air flow patterns based on a data representation of air flow paths created based on the movement patterns and camera data.

15. The computer program product of claim 13, further comprising:

wherein a fitness of the one or more additional autonomous vehicles falls below the threshold value.

16. The computer program product of claim 13, wherein the autonomous vehicle is equipped with one or more air flow generating devices.

17. The computer program product of claim 13, further comprising:

selecting a rescue method based on the dimension and shape of the passage.

* * * * *